No. 763,898. PATENTED JUNE 28, 1904.
C. H. HOSKINS.
LOCKING BAR PIPE.
APPLICATION FILED APR. 5, 1902.
NO MODEL.

Witnesses:

Inventor:
Charles Henry Hoskins
by Richards
ATTORNEYS.

No. 763,898. Patented June 28, 1904.

UNITED STATES PATENT OFFICE.

CHARLES HY. HOSKINS, OF PERTH, WESTERN AUSTRALIA, AUSTRALIA.

LOCKING-BAR PIPE.

SPECIFICATION forming part of Letters Patent No. 763,898, dated June 28, 1904.

Application filed April 5, 1902. Serial No. 101,584. (No model.)

*To all whom it may concern:*

Be it known that I, CHARLES HY. HOSKINS, a subject of the King of Great Britain, and a resident of Perth, Western Australia, Commonwealth of Australia, have made certain new and useful Improvements in Locking-Bar Pipe, of which the following is a specification taken in connection with the accompanying drawings, which form a part of the same.

This invention relates to locking-bar pipe, and relates especially to the formation of joints for such pipe.

In accordance with this invention the locking-bars adjacent the ends of the pipe-sections may be formed substantially flush with the adjacent pipe-plates, so as to form a substantially cylindrical surface at the ends of the pipe-sections. In this way the formation of joints is very much facilitated, and a perfectly-circular ring may be used to join the adjacent pipe-sections. Increased strength and reliability of the joint is secured by the use of circular joint-rings, and, furthermore, where lead is used at the joint the calking process is greatly facilitated and made more effective than is the case where an irregular joint-ring is used and is formed with offsets to accommodate the projecting locking-bars extending in normal position beyond the surface of the pipe-plates.

Figure 1:
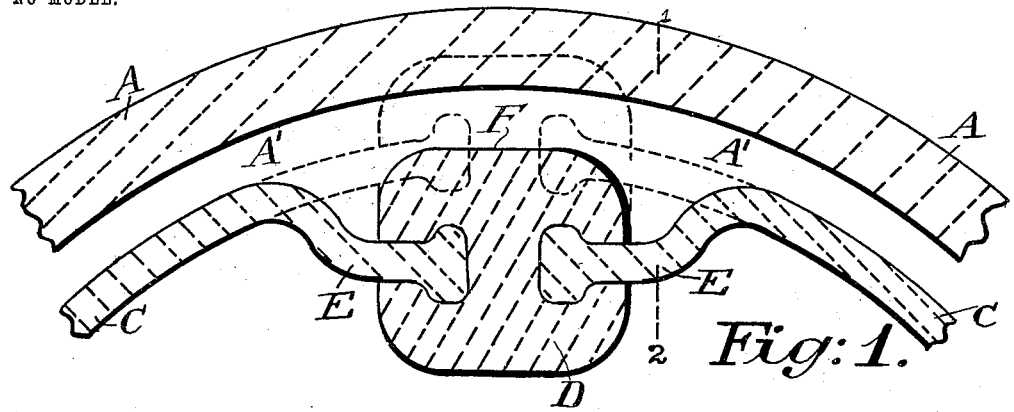
Figure 2:
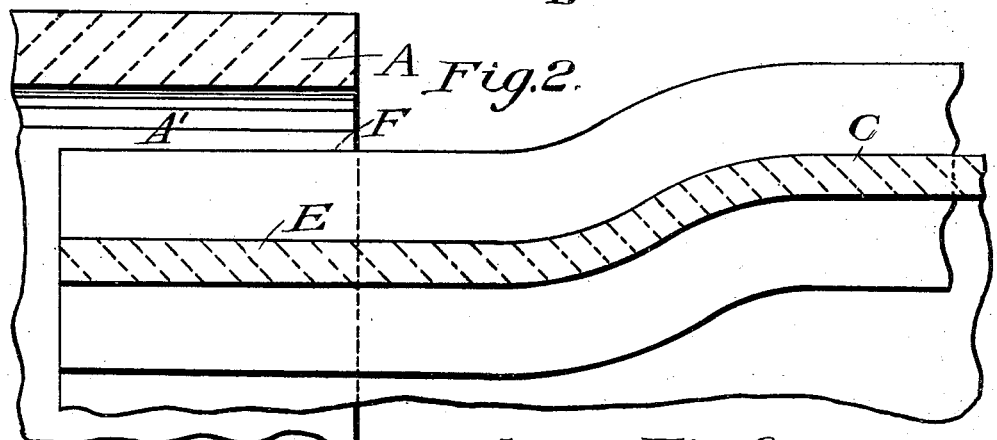
Figure 3:
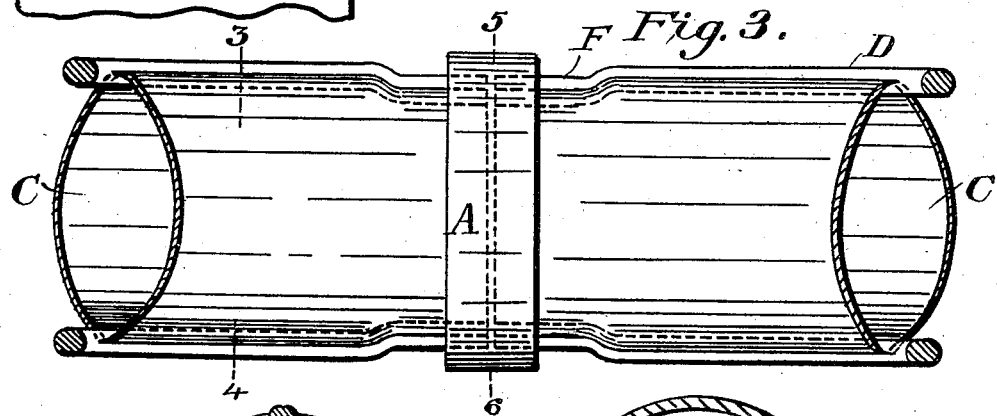
Figure 4:
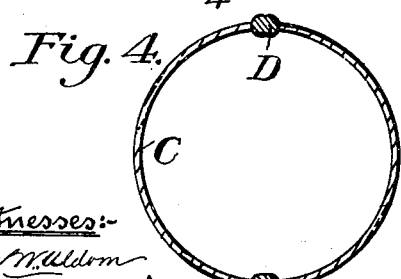
Figure 5:
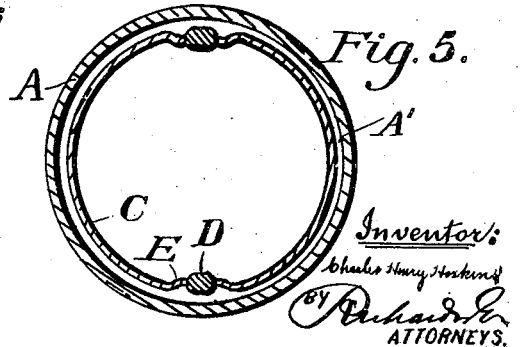

In the accompanying drawings, Figure 1 is an enlarged detail, shown in transverse section, of a joint embodying this invention. Fig. 2 is a similar detail shown in longitudinal section substantially on the line 1 2 of Fig. 1. Fig. 3 is a side view of two locking-bar pipe-sections joined together according to this invention. Fig. 4 is a transverse section of the same on the line 3 4 of Fig. 3, and Fig. 5 is similar section on the line 5 6 of Fig. 3.

As is seen in Figs. 3 and 4, the locking-bar pipe is formed of the pipe-plates C, which are joined by the two locking-bars D, these locking-bars firmly engaging the flanged edges of the pipe-plates and rigidly holding them in position, as is well known in this art and as is indicated in Fig. 1. The ends of the pipe-sections may be given a cylindrical surface for joining purposes by making the locking-bars substantially flush with the surface of the pipe-plates. This may be accomplished by offsetting the ends of the locking-bars for a suitable distance—about eight inches or so— at the ends of the pipe-sections, so that one surface of the locking-bar is brought substantially flush with the adjacent pipe-plates, the whole forming a substantially cylindrical surface at the end of the pipe-section.

As is shown in the drawings the locking-bars D are offset by being forced inward until their outer surface F becomes substantially flush with the surface of the pipe-plates C, the distance between the locking-bars at the ends of the pipe-sections being substantially equal to the normal diameter of the pipe, it being obvious that the amount or depth of the offset controls the distance between the outside faces of the locking-bars. It will be seen also that the flanged edges E of the pipe-plates are also offset through a slight extent, the locking-bars according to this construction remaining of full size at the joint and the strength of the pipe being therefore unimpaired. The circular end of the pipe-section fits within a circular ring A, secured in any way to an adjacent pipe-section, and the joint may be formed by filling the annular space A' with lead, or it may be formed in other ways. Two similar pipe-sections having their locking-bars offset at the ends, so as to be substantially flush with the outer surface of the pipe-plates, are shown in Fig. 3 as butted together, the ring A covering the joint between these adjacent sections.

It is obvious that many variations in form, proportion, size, and number of parts may be made by those familiar with this art without departing from this invention or losing the advantages of the same. I do not therefore desire to be limited to the details of the disclosure which has been made in this case; but

What I claim as new, and what I desire to secure by Letters Patent, is set forth in the appended claims:

1. In combination, the pipe-plates, the locking-bars between the pipe-plates, said locking-bars being substantially flush with the outer surface of the pipe-plates near the butt-end of the pipe-section made up by the pipe-plates and a circular ring covering the joint between one pipe-section and the next, substantially as described.

2. In combination, pipe-plates, locking-bars between said pipe-plates, said locking-bars being offset so as to be substantially flush with the surface of said pipe-plates adjacent the ends of the pipe-sections and a ring between adjacent pipe-sections to join the same.

3. In combination, pipe-plates, locking-bars between said pipe-plates, said locking-bars being substantially flush with the surface of said pipe-plates adjacent the ends of the pipe-sections and a ring between adjacent pipe-sections to join the same.

4. In combination, pipe-plates, locking-bars between said pipe-plates, said locking-bars being substantially flush with the surface of said pipe-plates adjacent the ends of the pipe-sections to form a substantially cylindrical surface and means to join the ends of adjacent pipe-sections.

5. In combination, pipe-plates, locking-bars between said pipe-plates, said locking-bars being offset so as to be substantially flush with the surface of said pipe-plates adjacent the end of the pipe-section to form a substantially cylindrical surface.

6. In combination, pipe-plates, locking-bars between said pipe-plates, said locking-bars being substantially flush with the surface of said pipe-plates adjacent the end of the pipe-section to form a substantially cylindrical surface.

In witness whereof I have hereunto set my hand in presence of two witnesses.

CHARLES HY. HOSKINS.

Witnesses:
RICHARD SPARROW,
FRED WALTHAM.